(12) United States Patent
Agbabian (10) Patent No.: US 7,831,705 B1
(45) Date of Patent: Nov. 9, 2010

(54) DISTRIBUTED EVENT CORRELATION USING HORIZONTALLY PARTITIONED RULESETS

(75) Inventor: Paul Agbabian, Los Angeles, CA (US)

(73) Assignee: Symantec Corporation, Mountain View, CA (US)

( * ) Notice: Subject to any disclaimer, the term of this patent is extended or adjusted under 35 U.S.C. 154(b) by 1588 days.

(21) Appl. No.: 11/107,488

(22) Filed: Apr. 14, 2005

(51) Int. Cl.
*G06F 15/173* (2006.01)
*G06F 11/00* (2006.01)

(52) U.S. Cl. .............................. 709/224; 726/22; 726/24
(58) Field of Classification Search ................ 709/224; 726/23
See application file for complete search history.

(56) References Cited

U.S. PATENT DOCUMENTS 7,376,969 B1 * 5/2008 Njemanze et al. ............. 726/22
7,418,733 B2 * 8/2008 Connary et al. ............... 726/25
2007/0169194 A1 * 7/2007 Church et al. ................ 726/23

OTHER PUBLICATIONS

Porras et al., "Emerald: Event Monitoring Enabling Responses to Anomalous Live Disturbances", Oct. 9, 1997, pp. 1-20 [online]. Retrieved on Feb. 3, 2005. Retrieved from the Internet: <URL:http://www.sdl.sri.com/projects/emerald/emerald-niss97.html>.
Symantec Corporation, "Symantec™ Gateway Security 5400 Series Reference Guide", Aug. 27, 2003, Appendix B, pp. 278-516.

* cited by examiner

*Primary Examiner*—Benjamin R Bruckart
*Assistant Examiner*—Shripal K Khajuria
(74) *Attorney, Agent, or Firm*—Gunnison, McKay & Hodgson, L.L.P.; Serge J. Hodgson (57) ABSTRACT

Events are preprocessed and rulesets are horizontally partitioning among rule computer systems. This allows the event analysis to be horizontally partitioned onto different rule computer systems. Thus, event correlation across large, high-speed networks is readily performed. Further, by increasing or decreasing the granularization of the horizontally partitioning of the rulesets, the event correlation is readily scalable.

7 Claims, 4 Drawing Sheets

DISTRIBUTED EVENT CORRELATION USING HORIZONTALLY PARTITIONED RULESETS

BACKGROUND OF THE INVENTION

1. Field of the Invention

The present invention relates to the protection of computer systems. More particularly, the present invention relates to an event correlation system and method.

2. Description of the Related Art

Network intrusion detection systems (NIDS) such as Symantec ManHunt™ network intrusion detection system are capable of detecting actual and suspected internal and external intrusions, e.g., stealth scans, and denial-of-service attacks. The actual and suspected internal and external intrusions and denial-of-service attacks are referred to as threats. Other examples of threats include the actual and suspected detection of malicious code, e.g., a virus, on a host computer system. There are many other examples of threats depending upon the type of monitoring system being used.

The detection of a threat can be defined as an event. Generally, an event is an occurrence of some importance, e.g., has been identified as an occurrence that is to be monitored, and frequently one that has antecedent cause, e.g., is associated with malicious code.

Events are forwarded to a single correlation node, due the stateful nature of statistical and rules-based analysis systems. The single correlation node may also receive events from other systems. This allows the single correlation node to process all of the events on a network or a plurality of networks being monitored by the single correlation node.

However, the single correlation node is often faced with an information overload. More particularly, by providing the single correlation node information on all of the events on a network or a plurality of networks being monitored, the single correlation node is given more information than the single correlation node can readily process and analyze.

SUMMARY OF THE INVENTION

In accordance with one embodiment, a method includes receiving an event, determining a classification(s) of the event, and appending the classification(s) to the event to create a tagged event. A destination rule computer system for the tagged event is determined and the tagged event is forwarded to the destination rule computer system.

In accordance with another embodiment, a method includes receiving a tagged event with a rule computer system having a ruleset, the tagged event including a classification(s) of an event. The method further includes obtaining the classification(s) and determining whether the classification(s) corresponds to a rule context of the ruleset. If the classification(s) does not correspond to the rule context, the tagged event is dropped. Conversely, if the classification(s) does correspond to the rule context, the tagged event is inspected.

In accordance with another embodiment, events are preprocessed and rulesets are horizontally partitioning among rule computer systems. This allows the event analysis to be horizontally partitioned onto different rule computer systems. Thus, event correlation across large, high-speed networks is readily performed. Further, by increasing or decreasing the granularization of the horizontally partitioning of the rulesets, the event correlation in accordance with this embodiment is readily scalable.

Embodiments in accordance with the present invention are best understood by reference to the following detailed description when read in conjunction with the accompanying drawings.

BRIEF DESCRIPTION OF THE DRAWING

Common reference numerals are used throughout the drawings and detailed description to indicate like elements.

DETAILED DESCRIPTION

Figure 1:
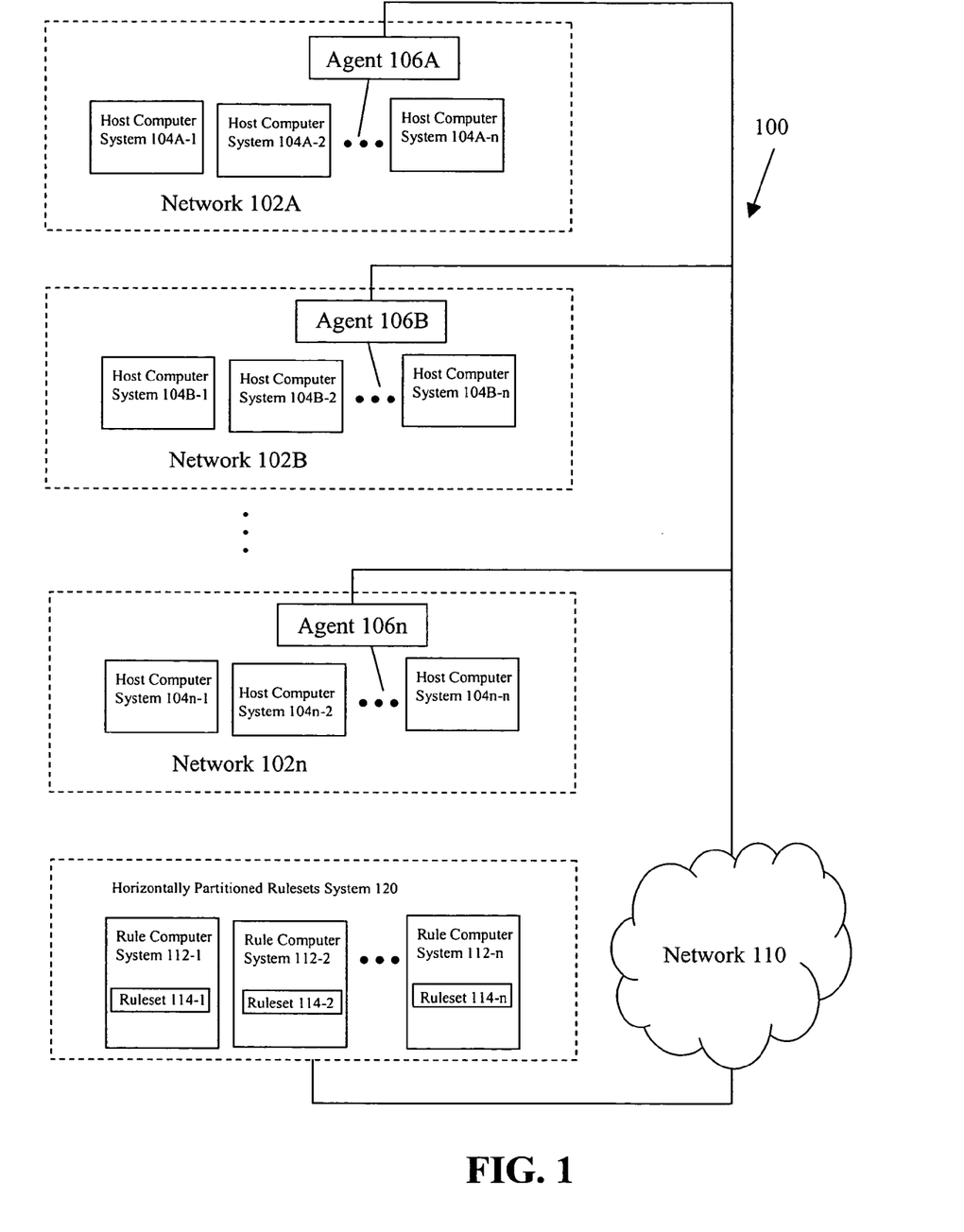
FIG. 1 is a diagram of a computer system that includes a plurality of networks in accordance with one embodiment of the present invention.
Figure 2:
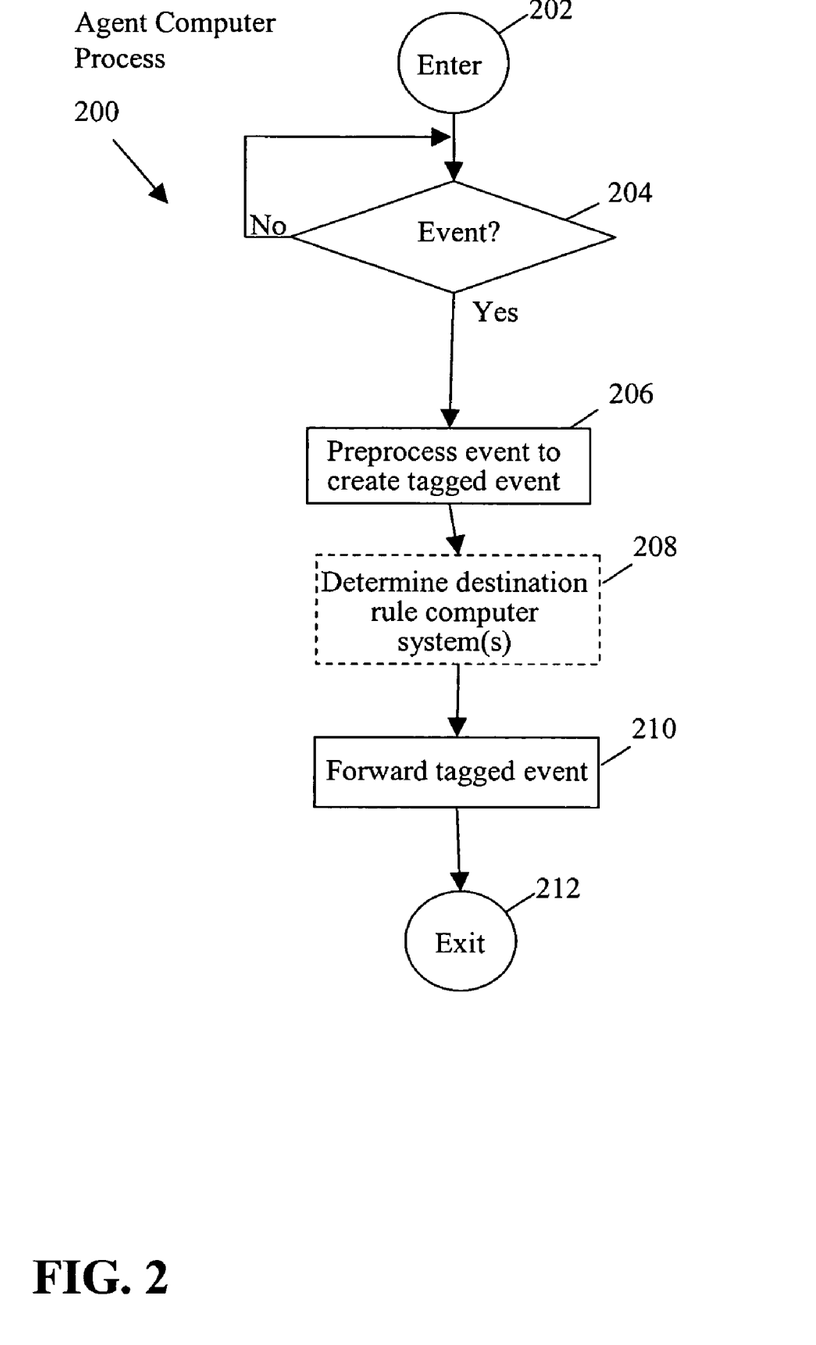
FIG. 2 is a flow diagram of an agent computer process in accordance with one embodiment of the present invention.

In accordance with one embodiment, referring to FIGS. 1 and 2 together, events are preprocessed by host computer systems 104 and/or agents 106 and tagged in a PREPROCESS EVENT TO CREATE TAGGED EVENT OPERATION 206. The tagged events are forwarded to the particular horizontally partitioned rule computer system(s) 112 having a rule context corresponding to the classification(s) of the tagged event in a FORWARD TAGGED EVENT OPERATION 210.

In one embodiment, the tagged event is forwarded only to rule computer systems having a rule context corresponding to the classification(s) of the tagged event. This avoids unnecessary traffic over network 110. More particularly, this avoids sending tagged events to rule computer systems that do not have a rule context corresponding to the classification(s) of the tagged event. In this manner, discrimination against events that are not relevant to the rule context of a ruleset is achieved.

In one embodiment, the rule context of a ruleset is the conditions related to the ruleset. More particularly, a ruleset (condition-action module) includes a plurality of rules. A rule is a conditional statement that when satisfied causes the rule to be fired. Thus, each rule is based on a condition(s) and these conditions define the rule context. In this manner, the rule context determines whether a particular rule and thus the ruleset finds the tagged event interesting.

Further, by preprocessing events and horizontally partitioning rulesets 114 among rule computer systems 112, the event analysis is horizontally partitioned onto different rule computer systems 112, sometimes called nodes. Thus, event correlation across large, high-speed networks is readily performed. Further, by increasing or decreasing the granularization of the horizontally partitioning of the rulesets, the event correlation in accordance with this embodiment is readily scalable.

More particularly, FIG. 1 is a diagram of a computer system 100 that includes a plurality of networks 102A, 102B, . . . , 102n, collectively networks 102, in accordance with one embodiment of the present invention. Referring to network 102A, network 102A includes a plurality of interconnected host computer systems 104A-1, 104A-2, . . . , 104A-n, collectively host computer systems 104A. Network 102A further includes an agent 106A also coupled to host computer systems 104A.

Similarly, networks 102B, ..., 102n also include a plurality of interconnected host computer systems 104B-1, 104B-2, ..., 104B-n, ..., 104n-1, 104n-2, ..., 104n-n, respectively. Host computer systems 104B-1, 104B-2, ..., 104B-n, ..., 104n-1, 104n-2, ..., 104n-n, are collectively referred to as host computer systems 104B, ..., 104n, respectively.

Networks 102B, ..., 102n further include agents 106B, ..., 106n also coupled to host computer systems 104B, ..., 104n, respectively.

Host computer systems 104A, 104B, ..., 104n and agents 106A, 106B, ..., 106n are collectively referred to as host computer systems 104 and agents 106, respectively.

Agents 106A, 106B, ..., 106n are computer systems, e.g., network intrusion detection systems, that are capable of detecting actual and suspected internal and external intrusions, e.g., stealth scans, and denial-of-service attacks on networks 102A, 102B, ..., 102n, respectively. The actual and suspected internal and external intrusions and denial-of-service attacks are referred to as threats. The detection of a threat by an agent 106 is defined as an event in one embodiment. For an exemplary listing of NIDS events, see Symantec™ Gateway Security 5400 Series Reference Guide, Appendix B, pages 278-516, which is herein incorporated by reference in its entirety.

Generally, an event is an occurrence of some importance, e.g., has been identified as an occurrence that is to be monitored, and frequently one that has antecedent cause, e.g., is associated with malicious code. An occurrence is something that takes place or happens.

In one embodiment, events are defined by an administrator. Thus, if an occurrence satisfies the definition of an event, the occurrence becomes an event. Conversely, if the occurrence does not satisfy any of the definitions of an event, the occurrence is not an event.

Events are well known to those of skill in the art and so are not discussed in great detail to avoid detracting from the principles of the invention. Further, the particular type of and configuration of networks 102, host computer systems 104 and agents 106 are not essential to this embodiment of the present invention.

Networks 102, and, more particularly, agents 106 and/or host computer systems 104 are coupled to a horizontally partitioned rulesets system 120 by a network 110. Network 110 is any network or network system that is of interest to a user.

Horizontally partitioned rulesets system 120 includes rule computer systems 112-1, 112-2, ..., 112-n, collectively rule computer systems 112, sometimes called at least two rule computer systems. Rule computer systems 112-1, 112-2, ..., 112-n include rulesets 114-1, 114-2, ..., 114-n, respectively. Rulesets 114-1, 114-2, ..., 114-n are collectively referred to as rulesets 114, sometimes called subsets of rules. Rule computer systems 112 are sometimes called horizontally partitioned nodes. In accordance with this embodiment, each ruleset 114 is a collection of rules that is different than the collection of rules in the other rulesets 114.

Rule computer systems 112 including rulesets 114 are horizontally partitioned such that rule computer systems 112 are peers, sometimes called equals, to one another. In one embodiment, horizontally partitioned means to have an absence of vertical hierarchy, i.e., to have an absence of a structure where one or more first computer systems provide input, e.g., a summary, into one or more higher level computer systems. Stated another way, in one embodiment, horizontally partitioned means to have an absence of dependency between computer systems.

In accordance with one embodiment, events are preprocessed by host computer systems 104 and/or agents 106 and tagged. The tagged events are forwarded to the particular rule computer system(s) 112 having a rule context corresponding to the classification(s) of the tagged event.

FIG. 2 is a flow diagram of an agent computer process 200 in accordance with one embodiment of the present invention. Execution of a partitioned rulesets distributed event correlation application on agent(s) 106 and/or host computer system(s) 104 results in the operations of agent computer process 200 as described below in one embodiment.

Referring now to FIGS. 1 and 2 together, from an ENTER OPERATION 202, flow moves to an EVENT CHECK OPERATION 204. In EVENT CHECK OPERATION 204, a determination is made as to whether an event has occurred. If an event has not occurred, flow remains at EVENT CHECK OPERATION 204. Conversely, if an event has occurred, flow moves from EVENT CHECK OPERATION 204 to a PREPROCESS EVENT TO CREATE TAGGED EVENT OPERATION 206.

Although EVENT CHECK OPERATION 204 is set forth above, in one embodiment, upon the occurrence of an event, flow directly moves to PREPROCESS EVENT TO CREATE TAGGED EVENT OPERATION 206. Any one of a number of techniques can be used to determine whether an event has occurred and to collect the event and the particular technique used is not essential to this embodiment of the present invention.

In PREPROCESS EVENT TO CREATE TAGGED EVENT OPERATION 206, the event is preprocessed to create a tagged event from the event. In one embodiment, the event is preprocessed by parsing, normalizing and classifying the event. Illustratively, parsing the event is to interpret the event from the physical form, e.g., syntax, that the event is collected from. Normalizing the event is formatting the event into a standard format, for example, independent of the particular device which detected the event. The event can be parsed and normalized using any one of a number of techniques and the particular technique used is not essential to this embodiment of the present invention.

Classifying the event is to determine the classification(s), sometimes called classification attribute(s), of the event. Illustratively, the computer system upon which agent computer process is being performed includes a listing of all possible events as well as an association of the events with the classification(s). Thus, to classify an event, the event is found in the listing and the associated classification(s) is retrieved.

The classification(s) of the event is appended to the event to create a tagged event. Thus, in accordance with this embodiment, a tagged event includes the information of the original event and the classification(s) of the event.

In another embodiment, a tagged event is an event which has been preprocessed to determine the classification(s) of the event. This classification(s) is used to determine the destination rule computer system(s) as discussed below in a DETERMINE DESTINATION RULE COMPUTER SYSTEM(S) OPERATION 208. However, the classification(s) are not necessarily included in the tagged event such that a rule computer system receiving the tagged event must itself determine the classification of the tagged event as discussed further below in a DETERMINE CLASSIFICATION(S) OF TAGGED EVENT OPERATION 306 of FIG. 3.

In one embodiment, a classification is a fundamental and distinct class to which events belong. Events can have one or more classifications.

In one example, classifications generally include effects, mechanisms, and resources associated with the event.

For example, classifications are established based upon the class of the protocol, e.g., File Transfer Protocol (FTP) or Hyper Text Transfer Protocol (HTTP), associated with the event.

As another example, classifications are established based upon the class of the behavior, e.g., a portscan or back door access attempt, associated with the event.

As yet another example, classifications are established based upon the class of the device, e.g., an IIS server, associated with the event.

As yet another example, classifications are established based upon the class of the host hardware, e.g., windows, unix, associated with the event.

As yet another example, classifications are established based upon the class of the suspected or actual malicious code, e.g., virus, worm, and/or trojans, associated with the event. In one embodiment, malicious code is defined as any computer program, module, set of modules, or code that enters a computer system without an authorized user's knowledge and/or without an authorized user's consent.

In one embodiment, a tagged event includes a classification field containing a classification value(s). The classification value(s) corresponds to the classification(s) of the event.

From PREPROCESS EVENT TO CREATE TAGGED EVENT OPERATION 206, flow moves, optionally, to a DETERMINE DESTINATION RULE COMPUTER SYSTEM(S) OPERATION 208. In DETERMINE DESTINATION RULE COMPUTER SYSTEM(S) OPERATION 208, the rule computer system or systems, e.g., one or more of rule computer systems 112 of FIG. 1, for which the tagged event is destined is determined.

In one embodiment, the rule computer system or systems having a rule context corresponding to the classification(s), i.e., to at least one classification, of the tagged event are determined to be the destination rule computer system or systems for the tagged event. In one embodiment, the host computer system 104 and/or agent 106 upon which agent computer process 200 is being performed includes a listing of all of the rule contexts of rule computer systems 112 as well as an association of the classifications to the rule context.

In one embodiment, the tagged event is destined for only a single rule computer system 112 of FIG. 1, sometimes called the destination rule computer system. In another embodiment, the tagged event is destined for two or more of the rule computer systems 112 of FIG. 1. In one embodiment, all of the rule computer systems having a rule context corresponding to the classification(s) of the tagged event are determined to be the destination rule computer systems for the tagged event.

Figure 3:
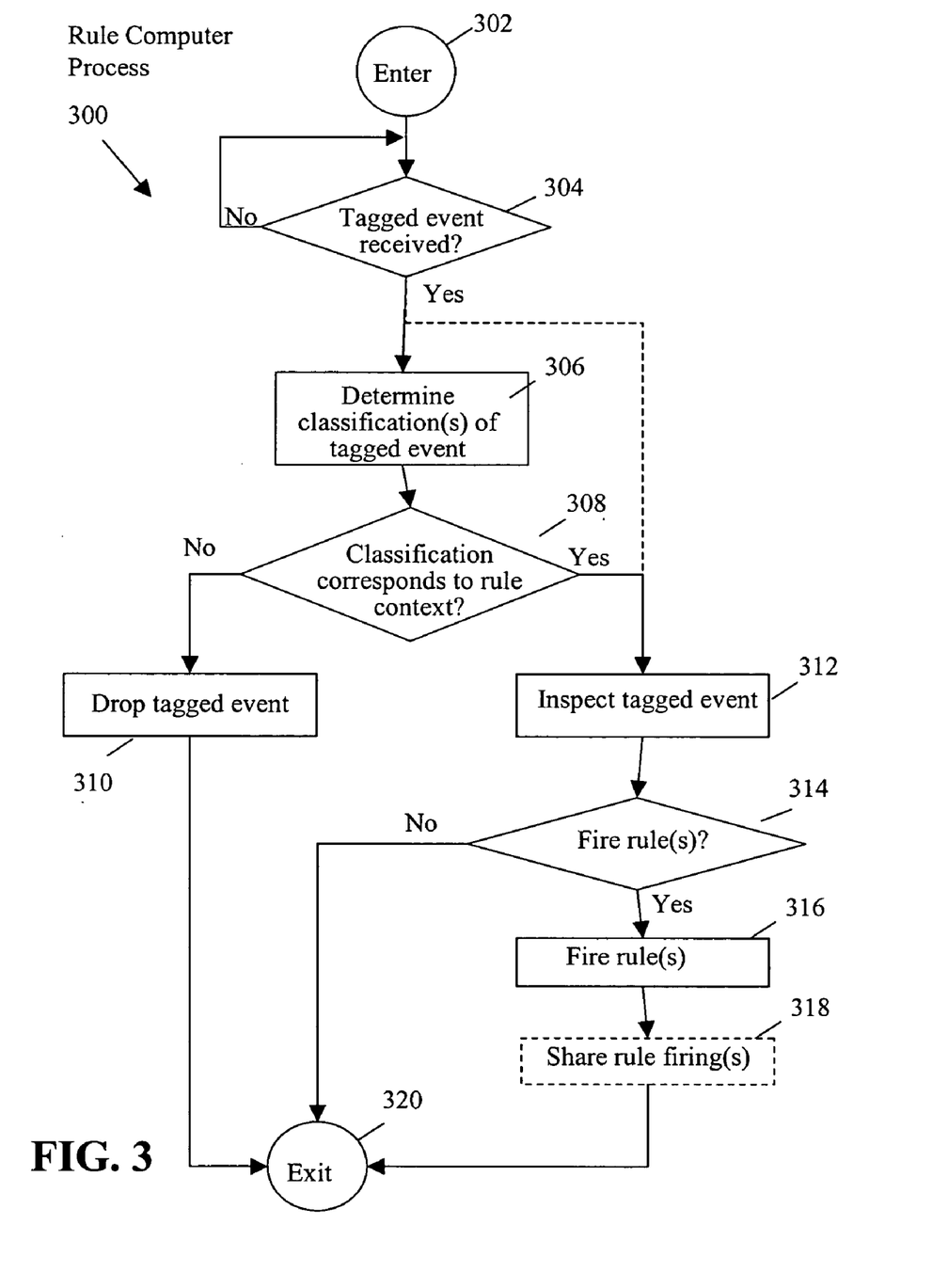
FIG. 3 is a flow diagram of a rule computer process in accordance with one embodiment of the present invention.

From DETERMINE DESTINATION RULE COMPUTER SYSTEM(S) OPERATION 208, flow moves to a FORWARD TAGGED EVENT OPERATION 210. In FORWARD TAGGED EVENT OPERATION 210, the tagged event is forwarded to the rule computer system or systems for processing of the tagged event. Illustratively, rule computer process 300 of FIG. 3 is performed to process the tagged event.

In one embodiment, the tagged event is forwarded to the destination rule computer system or systems determined in DETERMINE DESTINATION RULE COMPUTER SYSTEM(S) OPERATION 208. Accordingly, the tagged event is forwarded only to rule computer systems having a rule context corresponding to the classification(s) of the tagged event. This avoids unnecessary traffic over network 110. More particularly, this avoids sending tagged events to rule computer systems which do not have a rule context corresponding to the classification(s) of the tagged event. In this manner, discrimination against events that are not relevant to the rule context of a ruleset is achieved.

In another embodiment, the tagged event is forwarded to all of the rule computer systems in FORWARD TAGGED EVENT OPERATION 210. Each rule computer system in turn makes the determination as to whether the classification(s) of the tagged event corresponds to the rule context of the particular rule computer system. In accordance with this embodiment, DETERMINE DESTINATION RULE COMPUTER SYSTEM(S) OPERATION 208 is optional, and in one embodiment, is not performed. In accordance with this embodiment, flow moves directly from PREPROCESS EVENT TO CREATE TAGGED EVENT OPERATION 206 directly to FORWARD TAGGED EVENT OPERATION 210.

From FORWARD TAGGED EVENT OPERATION 210, flow moves to and exits at EXIT OPERATION 212 or returns to EVENT CHECK OPERATION 204 and awaits the next event.

In one embodiment, agent computer process 200 is a stateless process, i.e., only operates on the single event without information on the environment of all related events. This allows agent computer process 200 to be performed on a first computer system, e.g., a first agent 106 or a first host computer system 104, independently of the other computer systems.

FIG. 3 is a flow diagram of a rule computer process 300 in accordance with one embodiment of the present invention. In one embodiment, rule computer process 300 is performed by a rule computer system 112.

Referring now to FIG. 3, from an ENTER OPERATION 302, flow moves to a TAGGED EVENT RECEIVED CHECK OPERATION 304. In TAGGED EVENT RECEIVED CHECK OPERATION 304, a determination is made as to whether a tagged event has been received. Illustratively, agent computer process 200 of FIG. 2 is performed to create the tagged event and forward the tagged event to a rule computer system upon which rule computer process 300 is being performed.

If a tagged event has not been received, flow remains at TAGGED EVENT RECEIVED CHECK OPERATION 304. Conversely, if a tagged event has been received, flow moves from TAGGED EVENT RECEIVED CHECK OPERATION 304 to a DETERMINE CLASSIFICATION(S) OF TAGGED EVENT OPERATION 306.

Although TAGGED EVENT RECEIVED CHECK OPERATION 304 is set forth above, in one embodiment, upon the receipt of a tagged event, flow moves directly to DETERMINE CLASSIFICATION(S) OF TAGGED EVENT OPERATION 306 (or directly to INSPECT TAGGED EVENT OPERATION 312 as discussed below). Any one of a number of techniques can be used to determine whether a tagged event has been received and the particular technique used is not essential to this embodiment of the present invention.

In DETERMINE CLASSIFICATION(S) OF TAGGED EVENT OPERATION 306, the classification(s) of the tagged event is determined. As set forth above, in one embodiment, the tagged event includes its classification(s). This information is parsed from the tagged event in DETERMINE CLASSIFICATION(S) OF TAGGED EVENT OPERATION 306.

As also set forth above, in another embodiment, the rule computer system receiving the tagged event itself determines the classification(s) of the tagged event. Illustratively, the computer system upon which rule computer process 300 is being performed includes a listing of all possible tagged events as well as an association of the tagged events with the classification(s). Thus, to determine the classification(s) of the tagged event, the tagged event is found in the listing and the associated classification(s) is retrieved. However, the classification(s) of the tagged event can be determined using any one of a number of event classification techniques and the particular technique used is not essential to this embodiment of the present invention.

From DETERMINE CLASSIFICATION(S) OF TAGGED EVENT OPERATION 306, flow moves to a CLASSIFICATION CORRESPONDS TO RULE CONTEXT CHECK OPERATION 308. In CLASSIFICATION CORRESPONDS TO RULE CONTEXT CHECK OPERATION 308, a determination is made as to whether the classification(s), i.e., at least one classification, of the tagged event corresponds to the rule context of the ruleset of the rule computer system upon which rule computer process 300 is being performed. As discussed above, the classification(s) of the tagged event is determined in DETERMINE CLASSIFICATION(S) OF TAGGED EVENT OPERATION 306.

In one embodiment, the rule context of a ruleset is the conditions related to the ruleset. More particularly, a ruleset (condition-action module) includes a plurality of rules. A rule is a conditional statement that when satisfied causes the rule to be fired. Thus, each rule is based on a condition(s) and these conditions define the rule context. In this manner, the rule context determines whether a particular rule and thus the ruleset finds the tagged event interesting.

For example, rule context is based upon the class of the protocol, e.g., File Transfer Protocol (FTP) or Hyper Text Transfer Protocol (HTTP), associated with the rule.

As another example, rule context is based upon the class of the behavior, e.g., a portscan or back door access attempt, associated with the rule.

As yet another example, rule context is based upon the class of the device, e.g., an IIS server, associated with the rule.

As yet another example, rule context is based upon the class of the host hardware, e.g., windows, unix, associated with the rule.

As yet another example, rule context is based upon the class of the suspected or actual malicious code, e.g., virus, worm, and/or trojans associated with the rule.

Rules and rulesets are well known to those of skill in the art. One example of a rule is that a login is attempted against a critical server. Another example of a rule is that a portscan against three critical servers has occurred in the last five minutes. Another example of a rule is that there is a portscan against a critical server followed by a login attempt against the critical server. In this example, the three rules are grouped into a single ruleset. If the conditions of a rule of the ruleset are met, the rule fires, i.e., an indication that the conditions of the rule have been met is provided along with the actual details of the conditions that caused the rule to fire.

If a determination is made that the classification(s) does not correspond to the rule context in CLASSIFICATION CORRESPONDS TO RULE CONTEXT CHECK OPERATION 308, flow moves to a DROP TAGGED EVENT OPERATION 310. Stated another way, if a determination is made that the tagged event is unrelated to the ruleset of the rule computer system upon which rule computer process 300 is being performed in CLASSIFICATION CORRESPONDS TO RULE CONTEXT CHECK OPERATION 308, flow moves to DROP TAGGED EVENT OPERATION 310.

In DROP TAGGED EVENT OPERATION 310, the tagged event is dropped. In one embodiment, a tagged event is dropped by taking no further action with respect to the tagged event. In this manner, resources of the rule computer system upon which rule computer process 300 is being performed are not consumed in processing a tagged event that is unrelated to the ruleset of the rule computer system.

From DROP TAGGED EVENT OPERATION 310, flow moves to and exits at EXIT OPERATION 320 or returns to TAGGED EVENT RECEIVED CHECK OPERATION 304 and awaits receipt of the next tagged event.

Conversely, if a determination is made that the classification(s) does correspond to the rule context in CLASSIFICATION CORRESPONDS TO RULE CONTEXT CHECK OPERATION 308, flow moves to an INSPECT TAGGED EVENT OPERATION 312. Stated another way, if a determination is made that the tagged event is related to the ruleset of the rule computer system upon which rule computer process 300 is being performed in CLASSIFICATION CORRESPONDS TO RULE CONTEXT CHECK OPERATION 308, flow moves to INSPECT TAGGED EVENT OPERATION 312.

In INSPECT TAGGED EVENT OPERATION 312, the tagged event is inspected. The tagged event is inspected by parsing information from the tagged event in one embodiment. Generally, the ruleset of the rule computer system inspects tagged events flowing through the ruleset, accumulates tagged events of interest that meet the rule context of a rule of the ruleset.

From INSPECT TAGGED EVENT OPERATION 312, flow moves to a FIRE RULE(S) CHECK OPERATION 314. In FIRE RULE(S) CHECK OPERATION 314, a determination is made as to whether a rule or rules should be fired based upon the inspection of the tagged event performed in INSPECT TAGGED EVENT OPERATION 312. In one embodiment, a determination is made that a rule is to be fired when the conditions related to the rule are satisfied. Generally, when the goal state of a rule is reached, a determination is made that the rule should be fired. In one embodiment, each rule in the ruleset is configured to fire based on different conditions than the other rules of the ruleset.

If a determination is made that a rule should not be fired in FIRE RULE(S) CHECK OPERATION 314, flow moves to and exits at EXIT OPERATION 320 or returns to TAGGED EVENT RECEIVED CHECK OPERATION 304 and awaits receipt of the next tagged event. Conversely, if a determination is made that a rule(s) should be fired in FIRE RULE(S) CHECK OPERATION 314, flow moves to FIRE RULE(S) OPERATION 316.

In FIRE RULE(S) OPERATION 316, a rule or rules are fired. In one embodiment, firing of a rule, i.e., rule firing, includes providing an indication that the conditions of the rule have been met along with the actual details of the conditions that caused the rule to fire.

Inspection of events, determining whether a rule should be fired, and firing of rules are well known to those of skill in the art and so are not discussed in detail herein to avoid detracting from the principles of the invention.

From FIRE RULE(S) OPERATION 316, flow moves to, optionally, a SHARE RULE FIRING(S) OPERATION 318. In SHARE RULE FIRING(S) OPERATION 318, the rule firing or rule firings are shared with other computer systems. Illustratively, the rule firing is shared with the other rule computer systems 112 of horizontally partitioned rulesets system 120. In this manner, a homogeneous, cross-correlated rule results (rule firings) set is formed.

In one embodiment, the rate of firing of rules is much less than the rate of events. Accordingly, sharing of the rule firings does not involve placement of a large amount of information on the network, e.g., network 110, to which the rule computer system is connected.

From SHARE RULE FIRING(S) OPERATION 318 (or directly from FIRE RULE(S) OPERATION 316 if SHARE RULE FIRING(S) OPERATION 318 is not performed), flow moves to and exits at EXIT OPERATION 320 or returns to TAGGED EVENT RECEIVED CHECK OPERATION 304 and awaits receipt of the next tagged event.

In one embodiment, referring now to FIGS. 2 and 3 together, the destination rule computer system is determined in DETERMINE DESTINATION RULE COMPUTER SYSTEM(S) OPERATION 208 and the tagged event is forwarded only to the destination rule computer system(s) in FORWARD TAGGED EVENT OPERATION 210. Accordingly, performance of agent computer process 200 has already verified that the classification(s) of the tagged event corresponds to the rule context of the rule computer system to which the tagged event is being forwarded.

Thus, in accordance with this embodiment, upon receipt of a tagged event in TAGGED EVENT RECEIVED CHECK OPERATION 304, flow moves directly from TAGGED EVENT RECEIVED CHECK OPERATION 304 to INSPECT TAGGED EVENT OPERATION 312 as indicated by the dashed line in FIG. 3. Thus, DETERMINE CLASSIFICATION(S) OF TAGGED EVENT OPERATION 306 and CLASSIFICATION CORRESPONDS TO RULE CONTEXT CHECK OPERATION 308 are not performed. However, in another embodiment, DETERMINE CLASSIFICATION(S) OF TAGGED EVENT OPERATION 306 and CLASSIFICATION CORRESPONDS TO RULE CONTEXT CHECK OPERATION 308 are performed to verify that the tagged event has not been forwarded to the rule computer system in error.

To illustrate, referring now to FIGS. 1, 2, and 3 together, assume the case where a first event is the detection by host computer system 104A-1 of malicious code by an antivirus scanner. The classification of the first event is that the first event includes use of an antivirus scanner. The rule context of ruleset 114-1 of rule computer system 112-1 is that an event must include the use of an antivirus scanner.

Thus, in accordance with this illustration, a determination is made that the first event has occurred in EVENT CHECK OPERATION 204. The first event is preprocessed to create a first tagged event in PREPROCESS EVENT TO CREATE TAGGED EVENT OPERATION 206.

A determination is made that the classification of the first tagged event corresponds to the rule context of ruleset 114-1 of rule computer system 112-1 in DETERMINE DESTINATION RULE COMPUTER SYSTEM(S) 208. Thus, in DETERMINE DESTINATION RULE COMPUTER SYSTEM(S) 208, a determination is made that rule computer system 112-1 is the destination rule computer system.

In FORWARD TAGGED EVENT OPERATION 210, the first tagged event is forwarded to rule computer system 112-1. In TAGGED EVENT RECEIVED CHECK OPERATION 304, a determination is made that the first tagged event is received by rule computer system 112-1. The first tagged event is inspected in INSPECT TAGGED EVENT OPERATION 312 after performance of DETERMINE CLASSIFICATION(S) OF TAGGED EVENT OPERATION 306 and CLASSIFICATION CORRESPONDS TO RULE CONTEXT CHECK OPERATION 308 or directly after performance of TAGGED EVENT RECEIVED CHECK OPERATION 304 depending upon the particular embodiment. Operation 314, and sometimes operations 316, 318 are performed.

In contrast, assume the case where a second event is the detection of a portscan of host computer system 104A-1. The classification of the second event is that the second event includes a portscan. The rule context of ruleset 114-2 of rule computer system 112-2 is that an event must include a portscan.

Thus, in accordance with this illustration, a determination is made that the second event has occurred in EVENT CHECK OPERATION 204. The second event is preprocessed to create a second tagged event in PREPROCESS EVENT TO CREATE TAGGED EVENT OPERATION 206.

A determination is made that the classification of the second tagged event corresponds to the rule context of ruleset 114-2 of rule computer system 112-2 in DETERMINE DESTINATION RULE COMPUTER SYSTEM(S) 208. Thus, in DETERMINE DESTINATION RULE COMPUTER SYSTEM(S) 208, a determination is made that rule computer system 112-2 is the destination rule computer system.

In FORWARD TAGGED EVENT OPERATION 210, the second tagged event is forwarded to rule computer system 112-2. In TAGGED EVENT RECEIVED CHECK OPERATION 304, a determination is made that the second tagged event is received by rule computer system 112-2. The second tagged event is inspected in INSPECT TAGGED EVENT OPERATION 312 after performance of DETERMINE CLASSIFICATION(S) OF TAGGED EVENT OPERATION 306 and CLASSIFICATION CORRESPONDS TO RULE CONTEXT CHECK OPERATION 308 or directly after performance of TAGGED EVENT RECEIVED CHECK OPERATION 304 depending upon the particular embodiment. Operation 314, and sometimes operations 316, 318 are performed.

Accordingly, by preprocessing events and horizontally partitioning rulesets among rule computer systems 112, the event analysis is horizontally partitioned onto different rule computer systems 112, sometimes called nodes. Thus, event correlation across large, high-speed networks is readily performed. Further, by increasing or decreasing the granularization of the horizontally partitioning of the rulesets, the event correlation in accordance with this embodiment is readily scalable.

Figure 4:
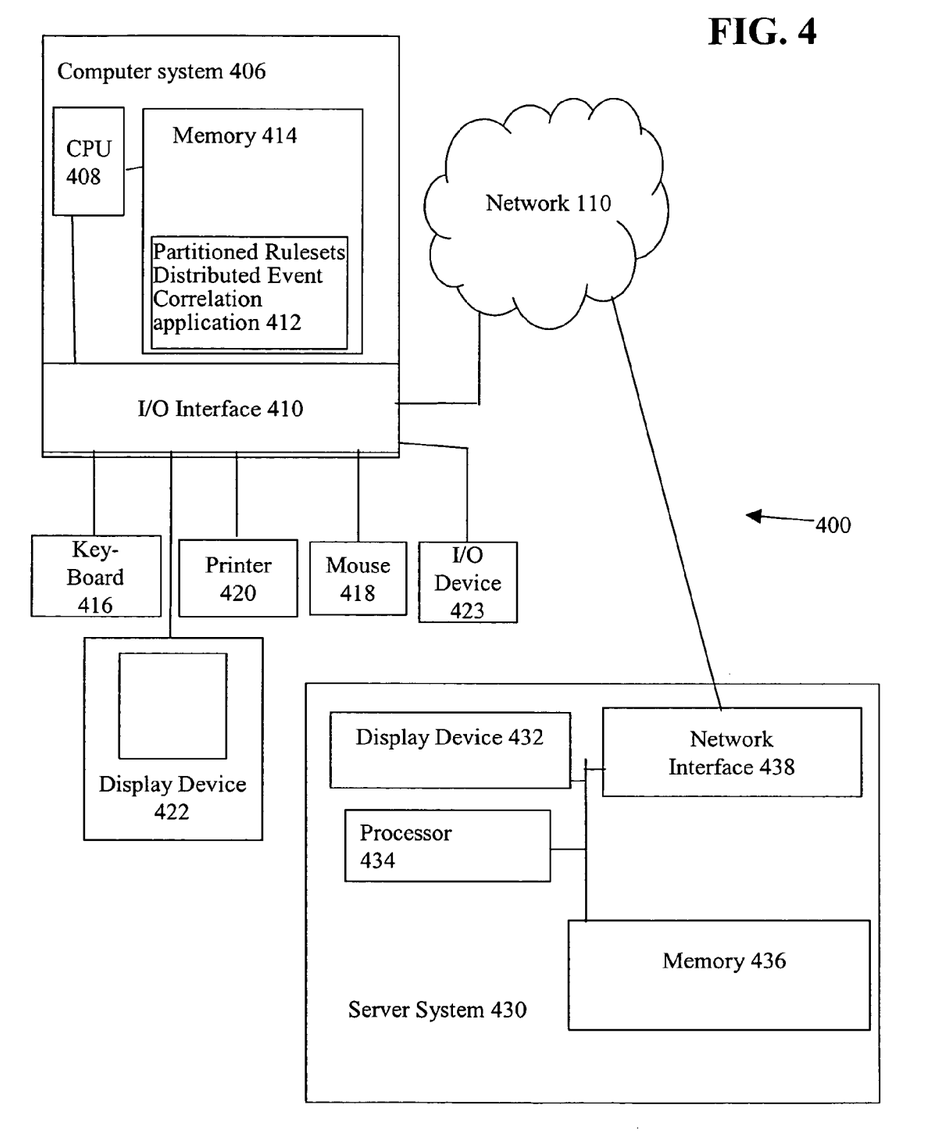
FIG. 4 is a diagram of a client-server system that includes a partitioned rulesets distributed event correlation application executing on a computer system in accordance with one embodiment of the present invention.

FIG. 4 is a diagram of a client-server system 400 that includes a partitioned rulesets distributed event correlation application 412 executing on a computer system 406, e.g., a first computer system, in accordance with one embodiment of the present invention. Referring now to FIGS. 1 and 4 together, computer system 406 is representative of an agent 106, a host computer system 104 and/or a rule computer system 112 of FIG. 1 in one embodiment. Further, client-server system 400 is part of computer system 100 (FIG. 1) in one embodiment.

Computer system 406, sometimes called a client or user device, typically includes a central processing unit (CPU) 408, hereinafter processor 408, an input output (I/O) interface 410, and a memory 414. Computer system 406 may further include standard devices like a keyboard 416, a mouse 418, a printer 420, and a display device 422, as well as, one or more standard input/output (I/O) devices 423, such as a compact disk (CD) or DVD drive, floppy disk drive, or other digital or waveform port for inputting data to and outputting data from computer system 406. In one embodiment, partitioned rulesets distributed event correlation application 412 is loaded into computer system 406 via I/O device 423, such as from a CD, DVD or floppy disk containing partitioned rulesets distributed event correlation application 412.

Computer system 406 is coupled to a server system 430 of client-server system 400 by network 110. Server system 430 typically includes a display device 432, a processor 434, a memory 436, and a network interface 438.

Network 110 can be any network or network system that is of interest to a user. In various embodiments, network interface 438 and I/O interface 410 include analog modems, digital modems, or a network interface card.

Partitioned rulesets distributed event correlation application 412 is stored in memory 414 of computer system 406 and executed on computer system 406. The particular type of and configuration of computer system 406 and server system 430 are not essential to this embodiment of the present invention.

Partitioned rulesets distributed event correlation application 412 is in computer memory 414. As used herein, a computer memory refers to a volatile memory, a non-volatile memory, or a combination of the two.

Although partitioned rulesets distributed event correlation application 412 is referred to an application, this is illustrative only. Partitioned rulesets distributed event correlation application 412 should be capable of being called from an application or the operating system. In one embodiment, an application is generally defined to be any executable code. Moreover, those of skill in the art will understand that when it is said that an application or an operation takes some action, the action is the result of executing one or more instructions by a processor. In one embodiment, execution of partitioned rulesets distributed event correlation application 412 by processor 408 results in the operations of agent computer process 200 and/or rule computer process 300.

While embodiments in accordance with the present invention have been described for a client-server configuration, an embodiment of the present invention may be carried out using any suitable hardware configuration and/or means involving a personal computer, a workstation, a portable device, or a network of computer devices. Other network configurations other than client-server configurations, e.g., peer-to-peer, web-based, intranet, internet network configurations, are used in other embodiments.

Herein, a computer program product comprises a medium configured to store or transport computer readable code in accordance with an embodiment of the present invention. Some examples of computer program products are CD-ROM discs, DVDs, ROM cards, floppy discs, magnetic tapes, computer hard drives, servers on a network and signals transmitted over a network representing computer readable code.

As illustrated in FIG. 4, this medium may belong to the computer system itself. However, the medium also may be removed from the computer system. For example, partitioned rulesets distributed event correlation application 412 may be stored in memory 436 that is physically located in a location different from processor 408. Processor 408 should be coupled to the memory 436. This could be accomplished in a client-server system, or alternatively via a connection to another computer via modems and analog lines, digital interfaces and a digital carrier line, or wireless or cellular connections.

More specifically, in one embodiment, computer system 406 and/or server system 430 is a portable computer, a workstation, a two-way pager, a cellular telephone, a smart phone, a digital wireless telephone, a personal digital assistant, a server computer, an Internet appliance, or any other device that includes components that can execute the partitioned rulesets distributed event correlation functionality in accordance with at least one of the embodiments as described herein. Similarly, in another embodiment, computer system 406 and/or server system 430 is comprised of multiple different computers, wireless devices, cellular telephones, digital telephones, two-way pagers, or personal digital assistants, server computers, or any desired combination of these devices that are interconnected to perform, the methods as described herein.

In view of this disclosure, the partitioned rulesets distributed event correlation functionality in accordance with one embodiment of the present invention can be implemented in a wide variety of computer system configurations. In addition, the partitioned rulesets distributed event correlation functionality could be stored as different modules in memories of different devices. For example, partitioned rulesets distributed event correlation application 412 could initially be stored in server system 430, and then as necessary, a portion of partitioned rulesets distributed event correlation application 412 could be transferred to computer system 406 and executed on computer system 406. Consequently, part of the partitioned rulesets distributed event correlation functionality would be executed on processor 434 of server system 430, and another part would be executed on processor 408 of computer system 406. In view of this disclosure, those of skill in the art can implement various embodiments of the present invention in a wide-variety of physical hardware configurations using an operating system and computer programming language of interest to the user.

In yet another embodiment, partitioned rulesets distributed event correlation application 412 is stored in memory 436 of server system 430. Partitioned rulesets distributed event correlation application 412 is transferred over network 110 to memory 414 in computer system 406. In this embodiment, network interface 438 and I/O interface 410 would include analog modems, digital modems, or a network interface card. If modems are used, network 110 includes a communications network, and partitioned rulesets distributed event correlation application 412 is downloaded via the communications network.

This disclosure provides exemplary embodiments of the present invention. The scope of the present invention is not limited by these exemplary embodiments. Numerous variations, whether explicitly provided for by the specification or implied by the specification or not, may be implemented by one of skill in the art in view of this disclosure.

What is claimed is:

1. A method comprising: receiving an event; determining at least one classification of said event; appending said classification to said event to create a tagged event; determining a destination rule computer system for said tagged event, said destination rule computer system being one of a plurality of horizontally partitioned rule computer systems comprising rulesets, each of said plurality of horizontally partitioned rule computer systems comprising a ruleset that is different than rulesets of the other of said plurality of horizontally partitioned rule computer systems, said determining a destination rule computer system for said tagged event comprising determining that said destination rule computer system comprises a rule context corresponding to said classification, said rule context being conditions related to a ruleset of said destination rule computer system; receiving said tagged event with said destination rule computer system; determining said classification of said tagged event; determining whether said classification corresponds with said rule context of said ruleset of said destination rule computer system, wherein upon a determination that said classification does not correspond with said rule context, said method further comprising dropping said tagged event, wherein upon a determination that said classification does correspond with said rule context, said method further comprising inspecting said tagged event; determining whether a rule of said ruleset should be fired based upon said inspecting said tagged event; wherein upon a determination that said rule should be fired, said method further comprising firing said rule; and sharing said firing with other computer systems.

2. The method of claim 1 further comprising forwarding said tagged event to said destination rule computer system.

3. The method of claim 1 wherein a horizontally partitioned rulesets system includes said plurality of horizontally partitioned rule computer systems.

4. The method of claim 1 further comprising forwarding said tagged event to said plurality of horizontally partitioned rule computer systems.

5. A computer-program product comprising a non-transmissible computer readable storage medium containing computer program code comprising: a partitioned rulesets distributed event correlation application for receiving an event; said partitioned rulesets distributed event correlation application further for determining at least one classification of said event; said partitioned rulesets distributed event correlation application further for appending said classification to said event to create a tagged event; said partitioned rulesets distributed event correlation application further for determining a destination rule computer system for said tagged event, said destination rule computer system being one of a plurality of horizontally partitioned rule computer systems comprising rulesets, each of said plurality of horizontally partitioned rule computer systems comprising a ruleset that is different than rulesets of the other of said plurality of horizontally partitioned rule computer systems, said determining a destination rule computer system for said tagged event comprising determining that said destination rule computer system comprises a rule context corresponding to said classification, said rule context being conditions related to a ruleset of said destination rule computer system; said partitioned rulesets distributed event correlation application further for receiving said tagged event with said destination rule computer system; said partitioned rulesets distributed event correlation application further for determining said classification of said tagged event; said partitioned rulesets distributed event correlation application further for determining whether said classification corresponds with said rule context of said ruleset of said destination rule computer system, wherein upon a determination that said classification does not correspond with said rule context, said partitioned rulesets distributed event correlation application further for dropping said tagged event, wherein upon a determination that said classification does correspond with said rule context, said partitioned rulesets distributed event correlation application further for inspecting said tagged event; said partitioned rulesets distributed event correlation application further for determining whether a rule of said ruleset should be fired based upon said inspecting said tagged event; wherein upon a determination that said rule should be fired, said partitioned rulesets distributed event correlation application further for firing said rule; and said partitioned rulesets distributed event correlation application further for sharing said firing with other computer systems.

6. A computer system comprising:
a memory having stored therein a partitioned rulesets distributed event correlation application; and a processor coupled to said memory, wherein execution of said partitioned rulesets distributed event correlation application generates a method comprising: receiving an event; determining at least one classification of said event; appending said classification to said event to create a tagged event;
determining a destination rule computer system for said tagged event, said destination rule computer system being one of a plurality of horizontally partitioned rule computer systems comprising rulesets, each of said plurality of horizontally partitioned rule computer systems comprising a ruleset that is different than rulesets of the other of said plurality of horizontally partitioned rule computer systems, said determining a destination rule computer system for said tagged event comprising
determining that said destination rule computer system comprises a rule context corresponding to said classification, said rule context being conditions related to a ruleset of said destination rule computer system; receiving said tagged event with said destination rule computer system; determining said classification of said tagged event; determining whether said classification corresponds with said rule context of said ruleset of said destination rule computer system, wherein upon a determination that said classification does not correspond with said rule context, said method further comprising dropping said tagged event, wherein upon a determination that said classification does correspond with said rule context, said method further comprising inspecting said tagged event; determining whether a rule of said ruleset should be fired based upon said inspecting said tagged event; wherein upon a determination that said rule should be fired, said method further comprising firing said rule; and sharing said firing with other computer systems.

7. A method comprising: receiving an event; determining at least one classification of said event; create a tagged event from said event by determining a destination rule computer system for said event using said classification, said destination rule computer system being one of a plurality of horizontally partitioned rule computer systems comprising rulesets, eac of said plurality of horizontally partitioned rule computer systems comprising a ruleset that is different than rulesets of the other of said plurality of horizontally partitioned rule computer systems, said determining a destination rule computer system for said event using said classification comprising determining that said destination rule computer system comprises a rule context corresponding to said classification, said rule context being conditions related to a ruleset of said destination rule computer system; forwarding said tagged event to said destination rule computer system; receiving said tagged event with said destination rule computer system; determining said classification of said tagged event; determining whether said classification corresponds with said rule context of said ruleset of said destination rule computer system, wherein upon a determination that said classification does not correspond with said rule context, said method further comprising dropping said tagged event, wherein upon a determination that said classification does correspond with said rule context, said method further comprising inspecting said tagged event; determining whether a rule of said ruleset should be fired based upon said inspecting said tagged event; wherein upon a determination that said rule should be fired, said method further comprising firing said rule; and sharing said firing with other computer systems.

* * * * *

UNITED STATES PATENT AND TRADEMARK OFFICE
CERTIFICATE OF CORRECTION

| | | |
|---|---|---|
| PATENT NO. | : 7,831,705 B1 | |
| APPLICATION NO. | : 11/107488 | |
| DATED | : November 9, 2010 | |
| INVENTOR(S) | : Paul Agbabian | |

It is certified that error appears in the above-identified patent and that said Letters Patent is hereby corrected as shown below:

In Column 14, Line 40, Claim 7, replace "eac" with --each--.

Signed and Sealed this
Twenty-fifth Day of January, 2011

David J. Kappos
*Director of the United States Patent and Trademark Office*